United States Patent [19]

Birchall et al.

[11] Patent Number: 4,861,735
[45] Date of Patent: Aug. 29, 1989

[54] PRODUCTION OF CERAMIC MATERIALS

[75] Inventors: James D. Birchall, Mouldsworth; Mary J. Mockford, Upton; David R. Stanley, Knutsford, all of England

[73] Assignee: Imperial Chemical Industries PLC, London, England

[21] Appl. No.: 112,890

[22] Filed: Oct. 27, 1987

[30] Foreign Application Priority Data

Oct. 29, 1986 [GB] United Kingdom ............... 8625899

[51] Int. Cl.$^4$ .............................................. C04B 35/58
[52] U.S. Cl. ........................................ 501/96; 501/98; 501/102; 501/126; 501/127; 501/128; 501/132; 501/153; 501/154; 423/289; 423/297; 423/344
[58] Field of Search ............... 501/98, 102, 126, 127, 501/128, 132, 153, 154, 96; 528/8, 29, 39

[56] References Cited

U.S. PATENT DOCUMENTS

| Re. 31,543 | 3/1984 | Bank et al. | 523/435 |
|---|---|---|---|
| Re. 32,107 | 4/1986 | January | 501/12 |
| 3,811,899 | 5/1974 | Stibbs et al. | 106/43 |
| 4,010,233 | 3/1977 | Winter et al. | 264/63 |
| 4,266,978 | 5/1981 | Prochazka | 106/39.5 |
| 4,342,680 | 8/1982 | Sugio et al. | 524/100 |
| 4,422,965 | 12/1983 | Chickering | 252/629 |
| 4,595,545 | 6/1986 | Sane | 264/65 |
| 4,606,902 | 8/1986 | Ritter | 423/345 |
| 4,636,378 | 1/1987 | Pastor et al. | 423/598 |

FOREIGN PATENT DOCUMENTS

| 38632 | 10/1981 | European Pat. Off. |  |
|---|---|---|---|
| 42660 | 12/1981 | European Pat. Off. |  |
| 115745 | 8/1984 | European Pat. Off. |  |
| 156491 | 10/1985 | European Pat. Off. |  |
| 239301 | 9/1987 | European Pat. Off. |  |
| 284235 | 9/1988 | European Pat. Off. |  |
| 53-72020 | 6/1978 | Japan | 501/96 |
| 57-17412 | 1/1982 | Japan |  |
| 1173993 | 12/1969 | United Kingdom |  |

OTHER PUBLICATIONS

"Boron-Metalloboron compounds and Boranes" (Adams ed.) pp. 301-303, published by Wiley.
"Comprehensive Inorganic Chemistry, vol. 1, published by Pergamon", pp. 699-700.
Ceramic Engineering and Science Proceedings, Sept.-Oct. 1985.
Chemical Abstracts vol. 96 No. 24, Jun., 1982, p. 137 No. 201996K.

*Primary Examiner*—William R. Dixon, Jr.
*Assistant Examiner*—Andrew Griffis
*Attorney, Agent, or Firm*—Cushman, Darby & Cushman

[57] ABSTRACT

A process for the production of a refractory boride or silicide which comprises producing an oxygen-containing polymeric product by reacting a compound of the metallic or non-metallic element having two or more groups reactive with hydroxyl groups and a compound of boron or silicon having two or more groups reactive with hydroxyl groups with an organic compound having two or more hydroxyl groups and heating the polymeric product in an inert atmosphere to pyrolyse the polymeric product and produce a refractory boride or silicide of the metallic or non-metallic element.

18 Claims, No Drawings

PRODUCTION OF CERAMIC MATERIALS

This invention relates to a process for the production of ceramic materials and in particular to a process for the production of refractory borides and silicides of metallic or non-metallic elements.

There are a number of known processes for the production of refractory borides and silicides of metallic or non-metallic elements, particularly for the production of such borides and silicides in particulate form.

For example, an oxide of the metallic or nonmetallic element in particulate form may be reacted in an inert atmosphere at elevated temperature in admixture with particulate carbon and particulate boron carbide. Alternatively, a particulate mixture of boric oxide, an oxide of the metallic or non-metallic element, and carbon, or a particulate mixture of boron and the metallic or non-metallic element, may be reacted in an inert atmosphere at elevated temperature. An example of the production of such a boride is provided by a process for the production of titanium boride according to the reaction scheme $$TiO_2 + B_2O_3 + 5C \rightarrow TiB_2 + 5CO$$

Such processes suffer from a problem in that it is difficult to achieve the necessary intimate contact between the components of the particulate mixture, for example between the oxide of the metallic or nonmetallic element, boric oxide, and carbon, in order that a boride of the metallic or non-metallic element having a uniform composition may be produced, that is a uniform composition on a molecular scale. In particular, the particles of the boride of the metallic or non-metallic element which are produced may be contaminated with unreacted metallic or non-metallic element or oxide thereof or with unreacted boron, boron carbide, or boric oxide, depending of course on the composition of the particulate mixture which is used in the production process. This is the case even when very finely divided particulate mixtures are used, and furthermore, in these processes it is difficult to produce particles of the boride of the metallic or nonmetallic element having a very small size, e.g. a size of less than 1 micron.

Silicides of metallic or non-metallic elements may be produced by processes similar to those described for the production of borides except that in this case the boron, or boron carbide, or boric oxide is replaced by silicon, or silicon carbide, or silica or a silicate, respectively. For example, a silicide may be produced by heating a particulate mixture of silicon and the metallic or non-metallic element in an inert atmosphere. However, such processes suffer from the same problems as are associated with the production of borides of metallic or non-metallic elements.

The present invention provides a process for the production of a boride or a silicide of a metallic or non-metallic element which process is adapted to produce a refractory boride or silicide of uniform quality and composition and which may be substantially free of impurities. This is of particular importance in more recently developed applications for such refractory borides or silicides. Thus, whereas in the traditional uses of refractory borides and silicides in such as an abrasive and in the manufacture of tools the quality of the boride or silicide might not have been of critical importance there are other uses of refractory borides and silicides which are of more recent development where the quality of the boride or silicide and its physical form may be of critical importance. These more recently developed uses include uses as engineering materials and uses in electronic applications.

According to the present invention there is provided a process for the production of a refractory boride or silicide of a metallic or non-metallic element which process comprises producing an oxygen-containing polymeric product by reacting a mixture of a first reactant which comprises a compound of the metallic or non-metallic element having two or more groups reactive with hydroxyl groups, a second reactant which comprises a compound of boron or silicon having two or more groups reactive with hydroxyl groups, and a third reactant which comprises an organic compound having two or more hydroxyl groups, and heating the polymeric product in an inert atmosphere to pyrolyse the polymeric product and produce a refractory boride or silicide of the metallic or non-metallic element.

Although the process is referred to as being for the production of a refractory boride or a refractory silicide it is to be understood that the process may be used to produce a mixture of a boride and a silicide of the same metallic or non-metallic element, for example, by using in the process as second reactant a compound of boron having two or more groups reactive with hydroxyl groups and a compound of silicon having two or more groups reactive with hydroxyl groups. Similarly, the process may be used to produce a mixture of refractory borides or silicides of two or more different metallic or non-metallic elements by using as first reactant compounds of two or more different metallic or non-metallic elements having two or more groups reactive with hydroxyl groups. However, for simplicity the process will be described hereafter by reference to the production of a boride or silicide of a single metallic or non-metallic element. Furthermore, although certain borides and silicides are well-defined compounds, for example titanium boride $TiB_2$, it is to be understood that the process of the present invention may be used in the production of borides and silicides other than such well-defined compounds, for example, in the production of borides and silicides which have some of the characteristics of an alloy of boron or silicon with the metallic or non-metallic element.

The metallic or non-metallic element must be such as to be capable of forming a refractory boride or silicide, and examples of such elements include molybdenum, aluminium, titanium, zirconium, vanadium, hafnium, tantalum, niobium, chromium, tungsten, iron, uranium, and lanthanum and other rare earth elements.

The first reactant comprises a compound of a metallic or non-metallic element having at least two groups reactive with hydroxyl groups, and it may in addition comprise groups which are not so reactive. For example, the compound may have a formula $MX_nY_m$ where M is the metallic or non-metallic element, X is a group which is reactive with hydroxyl groups, and Y is a group which is not reactive with hydroxyl groups, n is an integer of at least 2, and m is zero or an integer. The group X may be, for example, halide, e.g. chloride or bromide; amide; alkoxy, e.g. a group of the formula OR where R is an alkyl group having for example from 1 to 8 carbon atoms, e.g. methoxy, ethoxy or butoxy; or an ester group, e.g. acetoxy or propionoxy. The group Y, if present in the compound of the metallic or non-metallic element, may be, for example, a hydrocarbyl group, e.g. alkyl, cycloalkyl, aryl or alkaryl. Specific examples of such groups include, methyl, ethyl, propyl, cyclohexyl and benzyl. The group Y may be an oxy group, for example, the compound of the metallic or non-metallic element may be an oxyhalide.

Specific examples of compounds of metallic or non-metallic elements in which all of the groups therein are reactive with hydroxyl groups are tetraethoxy zirconium, pentaethoxy tantalum, penta-n-propoxy tantalum, titanium tetrachloride, zirconium tetrachloride, chlorotriethoxy zirconium, dichlorotributoxy tantalum, aluminium triisopropoxide and aluminium trichloride. Such compounds are preferred as the first reactant as they are generally easier to produce and less expensive when compared with compounds which also contain groups which are not reactive with hydroxyl groups. Furthermore, the use of such compounds leads to a desirable cross-linking in the polymeric product.

Examples of compounds of metallic or non-metallic elements which comprise groups which are, and groups which are not, reactive with hydroxyl groups include methyltrimethoxy zirconium, methyltriethoxy titanium, ethyltriethoxy titanium, dimethyldiethoxy zirconium, diphenyldiethoxy zirconium and titanium oxychloride, and equivalent compounds of other metallic or non-metallic elements.

In the process of the invention more than one such compound of the metallic or non-metallic element may be used.

In general the compound of the metallic or non-metallic element will not comprise hydroxyl groups as hydroxyl group containing compounds of metallic or non-metallic elements which are capable of forming a refractory boride or silicide are generally unstable, or they may not even exist as hydroxides, or they may readily condense to form a polymeric product, or they may exist as a hydrated oxide rather than as a hydroxide, e.g. as in the case of hydrated alumina. However, the possibility of using such compounds is not excluded.

The second reactant comprises a compound of boron or silicon having two or more groups reactive with hydroxyl groups. The second reactant may in addition contain groups which are not reactive with hydroxyl groups, and the compound may have a formula $AX_nY_m$ where A is silicon or boron, X is a group which is reactive with hydroxyl groups, and Y is a group which is not reactive with hydroxyl groups, n is an integer of at least 2, and m is zero or an integer. The group X may be, for example, halide, e.g. chloride or bromide; amide; alkoxy, e.g. a group of the formula OR where R is an alkyl group having for example from 1 to 8 carbon atoms, e.g. methoxy, ethoxy or butoxy; or an ester group, e.g. acetoxy or propionoxy. The group Y, if present in the compound of the metallic or nonmetallic element, may be, for example, a hydrocarbyl group, e.g. alkyl, cycloalkyl, aryl or alkaryl. Specific examples of such groups include, methyl, ethyl, propyl, cyclohexyl and benzyl. The group Y may be an oxy group, for example, the compound of boron or silicon may be an oxyhalide.

Specific examples of compounds of boron or silicon in which all of the groups therein are reactive with hydroxyl groups are tetramethoxysilane, tetraethoxysilane, silicon tetrachloride, silicon tetrabromide, dichlorodiethoxy silane, boron trichloride and boron triisopropoxide. Such compounds are preferred as the second reactant as they are generally easier to produce and less expensive when compared with compounds which also contain groups which are not reactive with hydroxyl groups. Furthermore, the use of such compounds leads to a desirable crosslinking in the polymeric product.

Examples of compounds of boron or silicon which comprise groups which are, and groups which are not, reactive with hydroxyl groups include methyltrimethoxysilane, methyltriethoxysilane, ethyltriethoxysilane, dimethyldiethoxysilane, dimethyldimethoxysilane, diphenyldiethoxysilane and phenyltrimethoxysilane, silicon oxychloride, ethyl dichloroborane, phenyl diethoxyborane, phenyl diacetoxyborane, methyl dichlorborane, and methyl diisopropoxyborane.

In general, and for the reasons advanced above in respect of the first reactant, the second reactant which is a compound of boron or silicon will not contain hydroxyl groups, although an exception is the compound $B(OH)_3$.

In the process of the invention more than one such compound of boron or silicon may be used, and also the second reactant may comprise a compound or compounds of boron and a compound or compounds of silicon.

Where a boride is to be produced in the process of the invention the compound of the first reactant may be a compound of silicon, for example, one or more compounds of silicon hereinbefore described with reference to the second reactant. Similarly, where a silicide is to be produced in the process of the invention the first reactant may be a compound of boron, for example one or more compounds of boron hereinbefore described with reference to the second reactant.

The third reactant comprises an organic compound having two or more hydroxyl groups. The organic compound may be, for example, aliphatic, aromatic, or cyclaliphatic. Examples of suitable aliphatic organic compounds containing two hydroxyl groups include glycols, e.g. ethylene glycol, propylene glycol, butylene glycol and diethylene glycol. Examples of suitable aliphatic organic compounds containing more than two hydroxyl groups include glycerol, trihydroxy butane and trihydroxy pentane. Examples of cycloaliphatic organic compounds containing at least two hydroxyl groups include dihydroxycyclohexane and trihydroxycyclohexane. Aromatic organic compounds which comprise two or more hydroxyl groups are advantageous as they comprise a large proportion of carbon and, when incorporated into the polymeric product, assist in achieving the required proportion of carbon to oxide in the coked product, as will be discussed hereafter. Examples of such aromatic compounds include cresols, dihydroxytoluene, and dihydroxynaphthalene.

The third reactant may comprise more than one compound having two or more hydroxyl groups, and the third reactant may comprise substituent groups other than hydroxyl groups.

The conditions under which the first reactant and the second reactant are reacted with the third reactant in the mixture thereof to produce the polymeric product will depend on the nature of the reactants and on whether or not a solvent for the reactants is used. It is desirable, in order to assist in the production of a polymeric product of uniform composition, that the mixture of the reactants is vigorously agitated.

It may be advisable, or even necessary, to effect reaction under a dry inert atmosphere, particularly where the first reactant and/or the second reactant is readily hydrolysable, for example, where the reactants are alkoxides, as in the case of a first reactant which is titanium alkoxide and a second reactant which is silicon alkoxide. Some reactants in the form of halides are also readily hydrolysable, for example as in the case of titanium tetrachloride and silicon tetrachloride.

The temperature at which reaction is effected will depend on the particular reactants. Thus, for example, where the first reactants are alkoxides or halides of titanium or zirconium, the second reactants are alkoxides or halides of silicon or boron, and the third reactants are glycols or polyols, e.g. ethylene glycol or glycerol, reaction may be allowed to proceed at or about ambient temperature, although with other reactants, and where reaction is effected in a solvent, it may be necessary to effect reaction at elevated temperature. The reaction temperature will generally not be above the boiling point of the solvent, where a solvent is used, although a temperature above the boiling point may be used where reaction is effected under elevated pressure. Where the reaction is a transesterification reaction in which an alcohol is eliminated, e.g. as in the case of reaction of a titanium alkoxide and a silicon alkoxide with a hydroxy compound, the reaction temperature is preferably above the boiling point of the alcohol which is eliminated on reaction.

Reaction may be assisted by the presence in the reaction mixture of suitable catalysts, for example, acid catalysts in the case where the reaction is a transesterification reaction. Suitable catalysts for such transesterification reactions are known in the art.

In the process of the invention the reactants are preferably chosen to be miscible with each other or to be soluble in a solvent. Where the reactants are miscible reaction results in production of a polymeric product of uniform composition, that is of a composition which is more uniform than that produced from reactants which are not miscible with each other. Where the reactants are not miscible with each other the reaction is preferably effected in a solvent for the reactants in order that a polymeric product of uniform composition may be produced. Even where the reactants are miscible with each other the reaction may be effected in a solvent for the reactants. It is also desirable that the polymeric product be soluble in or miscible with the reactants or with the solvent in order that the polymeric product shall be in a particularly tractable form. Such a solution may be spray-dried to produce a small particle size polymeric product which may then be converted to a boride or silicide of small and uniform particle size. The polymeric product solution may be used as an adhesive, e.g. for other refractory particles, and the polymeric product may subsequently be converted to a boride or silicide. The solution may be used as a coating composition or a film-forming composition from which a coating or a film of refractory boride or silicide may be produced. The solution of the polymeric product may be spun into the form of fibres.

In order to achieve the desired solubility of the polymeric product in a solvent it may be desirable to effect reaction for a time less than that required to achieve complete reaction in order to avoid an undesirable amount of cross-linking which may affect the solubility of the polymeric product in the solvent and which may result if reaction proceeds to, or near to, completion. Similarly, where reaction is effected in the absence of a solvent it may be desirable to effect reaction for a time less than that required to achieve complete reaction in order that the polymeric product is in a tractable form, and in particular is in a form in which it may be dissolved in a solvent prior to subsequent processing. However, where the polymeric product which is produced is intractable, and in particular is insoluble, it may for example be ground to a powder before further processing.

Before the polymeric product is used in the subsequent heating stage of the process of the invention it may be freed of unreacted reactants, if any, e.g. by use of a solvent which selectively removes these reactants, or by precipitation of the polymeric product from solution, or by any other convenient means. However, it may be unnecessary to take special steps to remove such unreacted reactants as they may be eeffectively removed from the polymeric product in the subsequent stages of the process.

The polymeric product is heated in an inert atmosphere to pyrolyse the polymeric product and produce a refractory boride or silicide of the metallic or non-metallic element.

The heating may be effected in two stages. Thus, the polymeric product may be heated in a first stage, for example, in an inert atmosphere, e.g. in an atmosphere of helium or nitrogen or in a vacuum to produce a coked product containing carbon and an oxide of the metallic or non-metallic element and an oxide of boron or silicon, and the coked product may then be heated in a second stage in an inert atmosphere to effect reaction between the oxides and the carbon to produce the refractory boride or silicide of the metallic or non-metallic element, and the process will be described hereafter by reference to such a two stage heating process. Before effecting the heating process the polymeric product, when in the form of a solution in a solvent, may be spray-dried to produce a small particle size polymeric product which may then be converted to a coked product of small particle size. The solution may be used as an adhesive, e.g. for other refractory particles, and the polymeric product may be converted to a coked product. The solution may be used as a coating composition or a film-forming composition from which a coating or film of the coked product may be produced. The polymeric product solution may be spun into the form of fibres.

The temperature at which heating is effected in the first stage in order to produce a coked product will depend on the nature of the organic component of the polymeric product but in general a temperature of up to 600° C. may suffice, although a higher temperature may be used, e.g. a temperature up to about 800° C. or even higher. The heating should be effected for a time sufficient for the organic component of the polymeric product to become substantially fully carbonised, for example, for a time sufficient for there to be little or no further loss in weight of the product at the chosen temperature.

In a subsequent second stage of the process the coked product is heated to a temperature above that at which the coking stage was effected and at which a so-called carbothermic reaction between the carbon and the oxides is effected. A temperature of up to about 1200° C. may suffice, although a higher temperature may be necessary, e.g. a temperature up to 1800° C., and the heating should be effected in an inert atmosphere, for example in an atmosphere of an inert gas, e.g. helium, or in a vacuum, until there is little or no further loss in weight.

In effecting the reaction of the first reactant and the second reactant with the third reactant it is desirable that the proportion of the first reactant to the second reactant be such as to give in the coked product the required proportion of oxide of the metallic or non-metallic element to oxide of silicon or boron, and thus the required proportion of metallic or non-metallic element to silicon or boron in the silicide or boride which is ultimately produced. For example, where the product of the process is to be titanium boride, $TiB_2$, the molar proportion of the first reactant, that is a titanium compound having two or more groups reactive with hydroxyl groups, to the second reactant, a boron compound having two or more groups reactive with hydroxyl groups, is theoretically in the region of 1 to 2. However, as some of the titanium or boron may be lost in the subsequent heating stages of the process, depending on the conditions used for these subsequent heating stages, it may be necessary to use a proportion of titanium compound to boron compound somewhat different from that theoretically required. The required proportion may be determined by means of simple experiment.

In effecting the process of the invention it is particularly preferred that proportion of the third reactant and the nature thereof, that is the organic compound having two or more hydroxyl groups, to the first and second reactants is chosen such that in the coked product produced from the polymeric product the proportion of carbon to the oxide of the metallic or non-metallic element and the oxide of boron or silicon is close to the proportion which is theoretically required.

In order to control the proportion of carbon to the oxide of the metallic or non-metallic element and the oxide of boron or silicon in the coked product produced from the polymeric product, the first reactant may comprise more than one compound of a metallic or non-metallic element having two or more groups reactive with hydroxyl groups, and it may also comprise one or more such compounds which have only one such reactive group. Similarly, the second reactant may comprise more than one compound of boron or silicon having two or more groups reactive with hydroxyl groups, and it may also comprise one or more such compounds which have only one such reactive group. The third reactant may comprise more than one organic compound having two or more hydroxyl groups, and it may also comprise one or more such compounds which have only one such hydroxyl group.

The proportion of carbon to the oxide of the metallic or non-metallic element and the oxide of boron or silicon in the coked product which is theoretically required will depend of course on the nature of the metallic or non-metallic element and on the stoichiometry of the carbothermic reaction between the carbon and the oxides. For example, where it is desired to produce titanium boride, $TiB_2$, the reaction of the oxides of titanium and boron with carbon may be expressed as $$TiO_2 + B_2O_3 + 5C \rightarrow TiB_2 + 5CO.$$

Thus, a proportion 5 moles of carbon for each mole of titanium oxide and boron oxide is theoretically required, which corresponds to percentages by weight as follows

| | |
|---|---|
| $TiO_2$ | 38.1 |
| $B_2O_3$ | 33.2 |
| Carbon | 28.7. |

On the other hand, where it is desired to produce tantalum boride, $TaB_2$, the reaction of the oxides of tantalum and boron with carbon may be expressed as $$Ta_2O_5 + 2B_2O_3 + 11C \rightarrow 2TaB_2 + 11CO.$$

Thus, a molar proportion of 11 moles of carbon for each mole of tantalum oxide and for each two moles of boron oxide is required, which corresponds to percentages by weight as follows,

| | |
|---|---|
| $Ta_2O_5$ | 62.0 |
| $B_2O_3$ | 19.5 |
| Carbon | 18.5. |

In the process of the invention the proportion of the first and second reactants to the third reactant is preferably chosen such that in the coked product the proportion of carbon to the oxide of the metallic or non-metallic element and the oxide of boron or silicon is in the range of 75% to 125% of the proportion which is theoretically required. For example, in the case where titanium boride is produced the theoretically required proportion by weight of carbon to titanium oxide and boron oxide is 28.7 to 71.3, that is 1:2.48, and the range 75% to 125% of the theoretically required proportion corresponds to a proportion of carbon to oxides of titanium and boron in range 1:1.86 to 1:3.10, which corresponds to compositions containing 35.0% by weight of carbon and 24.4% by weight of carbon.

In the coked product the closer is the proportion of carbon to the oxide of the metallic or non-metallic element and the oxide of boron or silicon to that which is theoretically required the greater is the purity of the refractory boride or silicide produced from the coked product by the carbothermic reaction, and for this reason it is preferred that this proportion is in the range of 90% to 110% of that which is theoretically required, more preferably in the range 95% to 105% of that which is theoretically required.

Various steps may be taken to control the proportion of carbon to the oxide of the metallic or non-metalic element and the oxide of boron or silicon in the coked product produced from the polymeric product. For example, where a relatively high proportion of carbon is required in the coked product the third reactant may comprise an organic compound which contains a cyclic group, e.g. an aromatic or cycloaliphatic group, or a group which is unsaturated, as the loss of carbon when a polymeric product produced from such a compound is converted to a coked product is not great, that is, there is a high carbon yield. Suitable such organic compounds include dihydroxynaphthalene and dihydroxycyclohexane. On the other hand, organic compounds containing aliphatic groups tend to suffer a high loss of carbon when a polymeric product produced from such a compound is converted to a coked product, and the loss of carbon is not greatly dependent on the chain length of the aliphatic group. Thus, where a coked product containing a high proportion of carbon is desired the use of aliphatic glycols and polyols, at least in a high proportion, is not preferred. The production of a polymeric product, and a coked product, which contains a high proportion of carbon is also favoured by use of an additional reactant in the reaction mixture which is an organic compound containing a single hydroxyl group, for example, furfuryl alcohol or cyclohexanol, or by use of an organic compound, which may be a third reactant or an additional reactant, containing an aromatic group. Such an organic compound containing a single hydroxyl group reacts with the metallic or non-metallic compound and the compound of boron or silicon to form a unit pendant from the chain of the polymeric product rather than a unit within the chain of the polymeric product.

Where a relatively high proportion of oxide of the metallic or non-metallic element and of boron or silicon is desired in the coked product the third reactant may comprise, or may consist of, an aliphatic glycol or polyol, e.g. ethylene glycol or glycerol, and/or the reaction mixture may comprise of as an additional reactant a compound of the metallic or non-metallic element having a single group reactive with hydroxyl groups and/or a compound of boron or silicon having a single group reactive with hydroxyl groups. Such compounds containing a single group reactive with hydroxyl groups react with the organic compound to form units pendant from the chain of the polymeric product rather than units within the chain of the polymeric product. Examples of such compounds include trialkyl alkoxy silane, e.g. trimethyl ethoxy silane, and corresponding compounds of titanium, zirconium, vanadium, tantalum and other metallic and non-metallic elements.

In the coked product produced from the polymeric product the proportion of carbon may be analysed by ignition of the coked product in an oxidising atmosphere and determination of the carbon dioxide produced, and the proportion of the oxide of the metallic or non-metallic element to the oxide of boron or silicon may be determined by chemical analysis. The relative proportions of the reactants, and the nature of the reactants, should be chosen, if necessary by means of a certain amount of experimentation, in order to produce the desired proportion of carbon to oxide of the metallic or non-metallic element and oxide of boron or silicon in the coked product produced from the polymeric product.

The invention is illustrated by the following Examples.

EXAMPLE 18.4 g (0.2 mole) of glycerol were charged to a reaction vessel fitted with a stirrer and a reflux condenser and a gas inlet and outlet. 11.4 g (0.05 mole) of tetraethoxytitanium and 14.6 g (0.1 mole) of triethoxyboron were then charged to the reaction vessel, the resulting mixture was stirred under an atmosphere of nitrogen, and the mixture was heated until no more of the ethanol formed by reaction could be removed from the reaction vessel by distillation. (The proportion of tetraethoxy titanium to triethoxy boron was that theoretically required to produce the titanium boride $TiB_2$) The product of reaction was a white waxy solid polymeric material which analysis showed had a atomic proportion of Ti to B of 1:1.95).

A portion of the white solid was charged to quartz tube and heated under an atmosphere of nitrogen up to a temperature of 800° C. and heating was continued at this temperature until there was no further loss in weight of the quartz tube and contents. The contents of the tube were a hard, glassy, grey-coloured material which was shown by analysis to have an atomic proportion of Ti to B of 1:1.99 and a carbon content of 24.5% by weight.

The hard glassy material was removed from the quartz tube, ground into a fine powder, and heated in a quartz tube in an atmosphere of helium at a temperature of 1450° C. for 8 hours. The resultant powder product was obtained in a yield of 95% of the theoretical yield and was identified by X-ray diffraction as $TiB_2$ together with a minor amount of $Ti_3O_5$.

EXAMPLE 2

6.1 g (0.066 mole) of glycerol, 4.65 g (0.017 mole) of zirconium tetraethoxide, and 4.9 g (0.033 mole) of triethoxyboron were reacted following the procedure described in Example 1. The reaction product, which was in the form of a white powder, was heated at 800° C. under an atmosphere of nitrogen in a quartz tube until there was no further loss in weight to produce a grey-black powder which was shown by analysis to contain 22% by weight of carbon. The grey-black powder was then heated in an alumina tube for 2 hours at 1450° C. in an atmosphere of helium to produce a grey powder which was shown by x-ray diffraction to consist of zirconium diboride ($Zr^B{}_2$) contaminated with minor amounts of $ZrO_2$ and $ZrO$.

EXAMPLE 3

5.72 g (0.03 mole) of iron triethoxide, 6.24 g (0.03 mole) of silicon tetraethoxide, and 6.45 g (0.07 mole) of glycerol were reacted following the procedure described in Example 1, except that 50 ml of dry ethanol was added to the reaction mixture as an aid to solubility. The reaction product, which was in the form of a brown powder, was heated at 800° C. under an atmosphere of nitrogen in a quartz tube until there was no further loss in weight to produce a black powder solid. The black powder was then heated in a quartz tube at 1450° C. for 10 hours in an atmosphere of helium to produce a powder product which was shown by x-ray diffraction to consist of the silicides $Fe_5Si_3$ and $Fe_3Si$ together with a trace of silicon carbide.

EXAMPLE 4

5.70 g (0.03 mole) of iron triethoxide, 4.45 g (0.03 mole) of triethoxy boron, and 6.17 g (0.067 mole) of glycerol were reacted following the procedure described in Example 1. The reaction product, which was in the form of a brown waxy solid, was heated at 800° C. under an atmosphere of nitrogen in a quartz tube until there was no further loss in weight to produce a black solid in a yield of 34% by weight. The black solid was ground to a powder and then heated in a quartz tube for 4 hours at 1550° C. in a vacuum to produce a grey powder which was shown by x-ray diffraction to consist of iron boride FeB.

We claim:

1. A process for the production of a refractory boride or silicide of a metallic or non-metallic element which process comprises producing an oxygen-containing polymeric product by reacting a mixture of a first reactant which comprises a compound of the metallic or non-metallic element having two or more groups reactive with hydroxyl groups, a second reactant which comprises a compound of boron or silicon having two or more groups reactive with hydroxyl groups, and a third reactant which comprises an organic compound having two or more hydroxyl groups, and heating the polymeric product in an inert atmosphere to pyrolyse the polymeric product and produce a refractory boride or silicide of the metallic or non-metallic element, said boride or silicide being characterized by its uniform composition.

2. A process as claimed in claim 1 in which the metallic or non-metallic element is selected from molybdenum, aluminium, titanium, zirconium, vanadium, hafnium, tantalum, niobium, chromium, tungsten, iron, uranium and lanthanum.

3. A process as claimed in claim 1 or claim 2 in which the first reactant has a formula $MX_nY_m$ where M is the metallic or non-metallic element, X is a group which is reactive with hydroxyl groups, and Y is a group which is not reactive with hydroxyl groups, n is an integer of at least 2, and m is zero or an integer.

4. A process as claimed in claim 3 in which the group X is selected from halide, amide, alkoxy, and ester groups.

5. A process as claimed in claim 1 in which the second reactant has a formula $AX_nY_m$ where A is silicon or boron, X is a group which is reactive with hydroxyl groups, and Y is a group which is not reactive with hydroxyl groups, n is an integer of at least 2, and m is zero or an integer.

6. A process as claimed in claim 5 in which the group X is selected from halide, amide, alkoxy, and ester groups.

7. A process as claimed in claim 1 in which the third reactant is selected from aliphatic, aromatic and cycloaliphatic compounds.

8. A process as claimed in claim 7 in which the reactants are miscible with each other.

9. A process as claimed in claim 8 in which reaction is effected in a solvent in which the reactants are soluble.

10. A process as claimed in claim 9 in which heating of the polymeric product is effected in two stages.

11. A process as claimed in claim 10 in which the polymeric product is heated in a first stage to produce a coker product containing carbon and an oxide of the metallic or non-metallic element and an oxide of boron or silicon.

12. A process as claimed in claim 11 in which the heating is effected at a temperature up to 800° C.

13. A process as claimed in claims 11 or claim 12 in which the coked product is heated in a second stage in an inert atmosphere to effect reaction between the oxides and carbon to produce a refractory boride or silicide.

14. A process as claimed in claim 13 in which the heating is effected at a temperature of up to 1800° C.

15. A process as claimed in claim 11 in which proportion of the organic compound having two or more hydroxyl groups to the first and second reactants is chosen such that in the coked product produced from the polymeric product the proportion of carbon to the oxide of the metallic or non-metallic element and the oxide of boron or silicon is in the range 75% to 125% of the proportion which is theoretically required.

16. A process is claimed in claim 15 in which the proportion of the organic compound having two or more hydroxyl groups to the first and second reactants is such that in the coked product produced form the polymeric product the proportion of carbon to the oxide of the metallic or non-metallic element and the oxide of boron or silicon is in the range 90% to 110% of the proportion which is the essentially required.

17. A process as claimed in claim 16 in which the reaction mixture comprises an organic compound containing a single hydroxyl group.

18. A process as claimed in claim 17 in which the reaction mixture comprises a compound of the metallic or non-metallic element having a single group reactive with hydroxyl groups and/or a compound of boron or silicon having a single group reactive with hydroxyl groups.

* * * * *